(12) United States Patent
Kloos

(10) Patent No.: US 9,791,120 B2
(45) Date of Patent: Oct. 17, 2017

(54) HEADLAMP FOR VEHICLES

(71) Applicant: Hella KGaA Hueck & Co., Lippstadt (DE)

(72) Inventor: Gerhard Kloos, Erwitte (DE)

(73) Assignee: Hella KGaA Hueck & Co, Lippstadt (DE)

( * ) Notice: Subject to any disclaimer, the term of this patent is extended or adjusted under 35 U.S.C. 154(b) by 223 days.

(21) Appl. No.: 14/747,809

(22) Filed: Jun. 23, 2015

(65) Prior Publication Data

US 2016/0025290 A1 Jan. 28, 2016

(30) Foreign Application Priority Data

Jul. 28, 2014 (DE) ........................ 10 2014 110 601

(51) Int. Cl.
| | |
|---|---|
| *F21V 5/00* | (2015.01) |
| *F21S 8/10* | (2006.01) |
| *G02B 3/02* | (2006.01) |
| *G02B 19/00* | (2006.01) |
| *G02B 27/00* | (2006.01) |
| *G02B 3/00* | (2006.01) |

(52) U.S. Cl.
CPC ....... *F21S 48/1266* (2013.01); *F21S 48/1154* (2013.01); *F21S 48/125* (2013.01); *G02B 3/02* (2013.01); *G02B 19/0066* (2013.01); *G02B 27/0012* (2013.01); *G02B 2003/0093* (2013.01)

(58) Field of Classification Search
CPC ....... F21V 33/008; A63B 63/00; A63B 67/02; A63B 67/06; A63B 71/02; F21L 4/02; F21S 48/1266; F21S 48/1154; G02B 3/02; G02B 2003/0093; G02B 19/0066; G02B 27/0012

USPC .......................................................... 362/520
See application file for complete search history.

(56) References Cited

U.S. PATENT DOCUMENTS

| | | | | |
|---|---|---|---|---|
| 2006/0132708 | A1* | 6/2006 | Landgrave | G02C 7/02 351/159.07 |
| 2012/0147321 | A1* | 6/2012 | Portney | A61F 2/1613 351/159.15 |

(Continued)

FOREIGN PATENT DOCUMENTS

| | | |
|---|---|---|
| DE | 102007018988 A1 | 10/2008 |
| DE | 102007018996 A1 | 10/2008 |
| EP | 2315068 A1 | 4/2011 |

*Primary Examiner* — Laura Gudorf
(74) *Attorney, Agent, or Firm* — Husch Blackwell LLP

(57) ABSTRACT

The invention relates to headlamps for vehicles comprising a number of semiconductor-based light sources being arranged on a substrate, and comprising an optical unit having at least one lens with a lens face for the generation of a given light distribution, wherein the lens face can be calculated by means of a lens equation, which is formed by means of a conic section equation completed by a deformation parameter, so that the lens face is determined with a deviation from a conic section shape, wherein a first deformation parameter for the change of the lens face according to differing degrees of shape change in the direction of the optical axis and vertically to the optical axis are given on one hand and that a second deformation parameter for the change of the lens face according to identical degrees of shape change in the direction of the optical axis and vertically to the optical axis are given on the other hand.

9 Claims, 2 Drawing Sheets

(56) References Cited

U.S. PATENT DOCUMENTS

Figure 1:
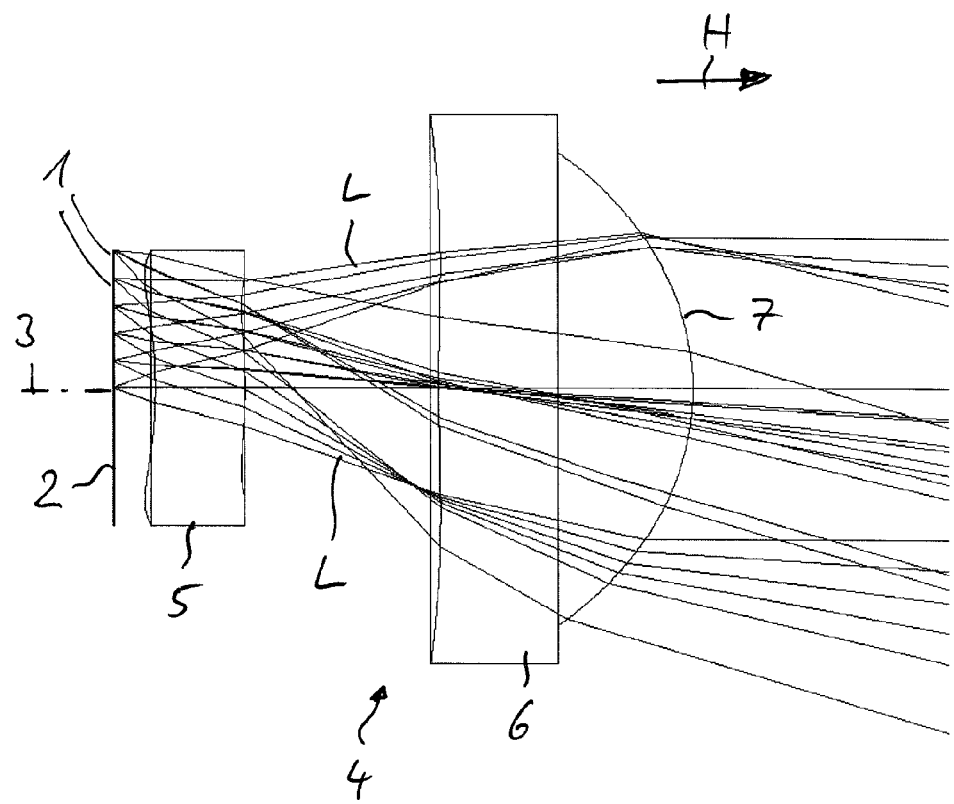

| | | | |
|---|---|---|---|
| 2013/0155712 A1* | 6/2013 | Kloos | F21S 48/1154 362/521 |
| 2014/0175978 A1* | 6/2014 | Kobayashi | F21S 48/1195 315/82 |
| 2014/0188959 A1* | 7/2014 | Kim | G02B 3/02 708/200 |

* cited by examiner

HEADLAMP FOR VEHICLES

The invention relates to headlamps for vehicles comprising a number of semiconductor-based light sources being arranged on a substrate, and comprising an optical unit having at least one lens with a lens face for the generation of a given light distribution, wherein the lens face can be calculated by means of a lens equation, which is formed by means of a conic section equation completed by a deformation parameter, so that the lens face is determined with a deviation from a conic section shape.

From DE 10 2012 106 490 A1, for example, a headlamp for vehicles is known, which comprises a multitude of semiconductor-based light sources (LED light sources) which are arranged in a matrix-like manner, and an optical unit arranged in front of them in the main radiation direction comprising a primary lens and a secondary lens. The secondary lens projects the light entering on the input side according to a given light distribution. To this end, an output-side lens face of the secondary lens is calculated by means of a conic section equation being completed by the deformation parameters. The deformation parameters are embodied as asphere terms, in each of which asphere coefficients are multiplied with an even-numbered power of the lateral distance of a point on the lens face. The following equation is used to this end:

$$z = \frac{cr^2}{1 + \sqrt{1 - (1 + K)c^2 r^2}} + \sum_{k=1}^{5} \alpha_{2k} r^{2k},$$

Herein is:

z=z-coordinate on the optical face,
r=lateral distance of a point of the optical face from the z-axis,
c=vertex radius of the aspherical baseline,
K=conical constant,
α=asphere coefficient.

The higher the demands on the accuracy of the lens face, the more asphere terms must be added to the first term of the lens equation representing the conic section equation. In case of headlamps with lenses demanding a high degree of correction, such as e.g. in case of LED matrix headlamps, a large number of asphere coefficients is required, which increases cost and effort. Furthermore, in case of additional asphere terms, an immediate geometric interpretation regarding lens face changes is not possible, which renders the calculation more difficult.

It is, therefore, the task of the present invention to further develop a headlamp for vehicles, comprising an optical unit with a lens, so that the calculation of a lens face is executed in a simpler and faster manner, while at the same time a relatively high degree of correction can be achieved.

To solve this task, the invention in combination with the Preamble of Patent claim 1 is characterized in that a first deformation parameter for the change of the lens face according to differing degrees of shape change in the direction of the optical axis and vertically to the optical axis is given on one hand and that a second deformation parameter for the change of the lens face according to identical degrees of shape change in the direction of the optical axis and vertically to the optical axis is given on the other hand.

The particular advantage of the invention is that a directed determination of an optimal lens face contour is possible, while the optimization steps relating to the lens face determination are geometrically interpretable. By this means, the solution path is more comprehensible than with an erratic search. As the deformation parameters according to the invention allow an easier geometrical-optical interpretation, the quality of the determined lens face solution can be assured better. It is easier to compare different lens faces, resp. further variants of the lens face shape can be derived more easily under changed boundary conditions. As a small number of describing parameters is required for the description of the lens face, the optimization of the lens face shape can be accelerated, be more robust and at the same time more easily designed in a graphical manner. A high degree of correction of the lens can therefore be achieved faster and in a more targeted manner.

According to the invention, a first deformation parameter is provided, whose variation allows a change of the lens face in different directions. It effects different degrees of deformation in the direction of the optical axis and vertically to the optical axis. It is essentially a laterally isotropic change of the lens face. Furthermore, a second deformation parameter is provided, whose variation leads to identical deformation degrees of the lens face, in the direction of the optical axis as well as vertically to the same. Therefore, a regular change is achieved, essentially isotropic. In an advantageous manner, a directed variation of the lens face is achieved by a change in the first deformation parameter and/or the second deformation parameter, so that the intended lens face shape can be found faster and more easily.

According to a further development of the invention, the first deformation parameter is embodied so that its variation effects an ellipsoid-of-rotation-shaped change of the lens face. Furthermore, the second deformation parameter is embodied so that its variation effects a spherical change of the lens face. The second deformation parameter does therefore allow an isotropic change of the lens face. The first deformation parameter effects a change of the lens face shape with differing degrees of deformation in the direction of the optical axis and vertically to the same. The change of the first deformation parameter does therefore effect a laterally isotropic change of the lens face. It is therefore a laterally isotropic change of the lens face description.

According to a preferred embodiment of the invention, the deformation parameters are each formed as a series, wherein summands of the series are formed by a product of a deformation coefficient and a position vector. The deformation parameters depend on a local coordinate in the Cartesian coordinate system of the lens face to be calculated. The local coordinate serves as a control variable of the face description and indicates the distance in space to one of the lens vertexes.

According to a preferred embodiment of the invention, the calculation of the lens face begins with a cone description (initial state) by means of a conic section equation to obtain a lens face (target state) fulfilling the photometric requirements, wherein the lens face is deformed by continuous deformation.

Further advantages of the invention result from the further subclaims.

An exemplary embodiment of the invention is described below in detail by means of the enclosed drawings.

Figure 2:
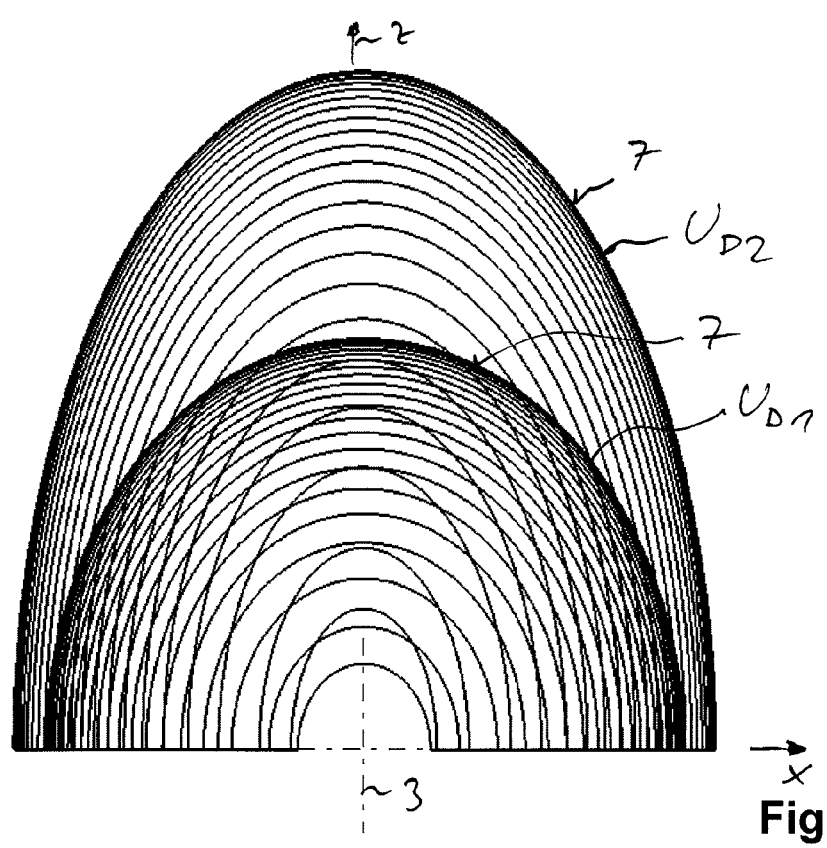
Figure 3:
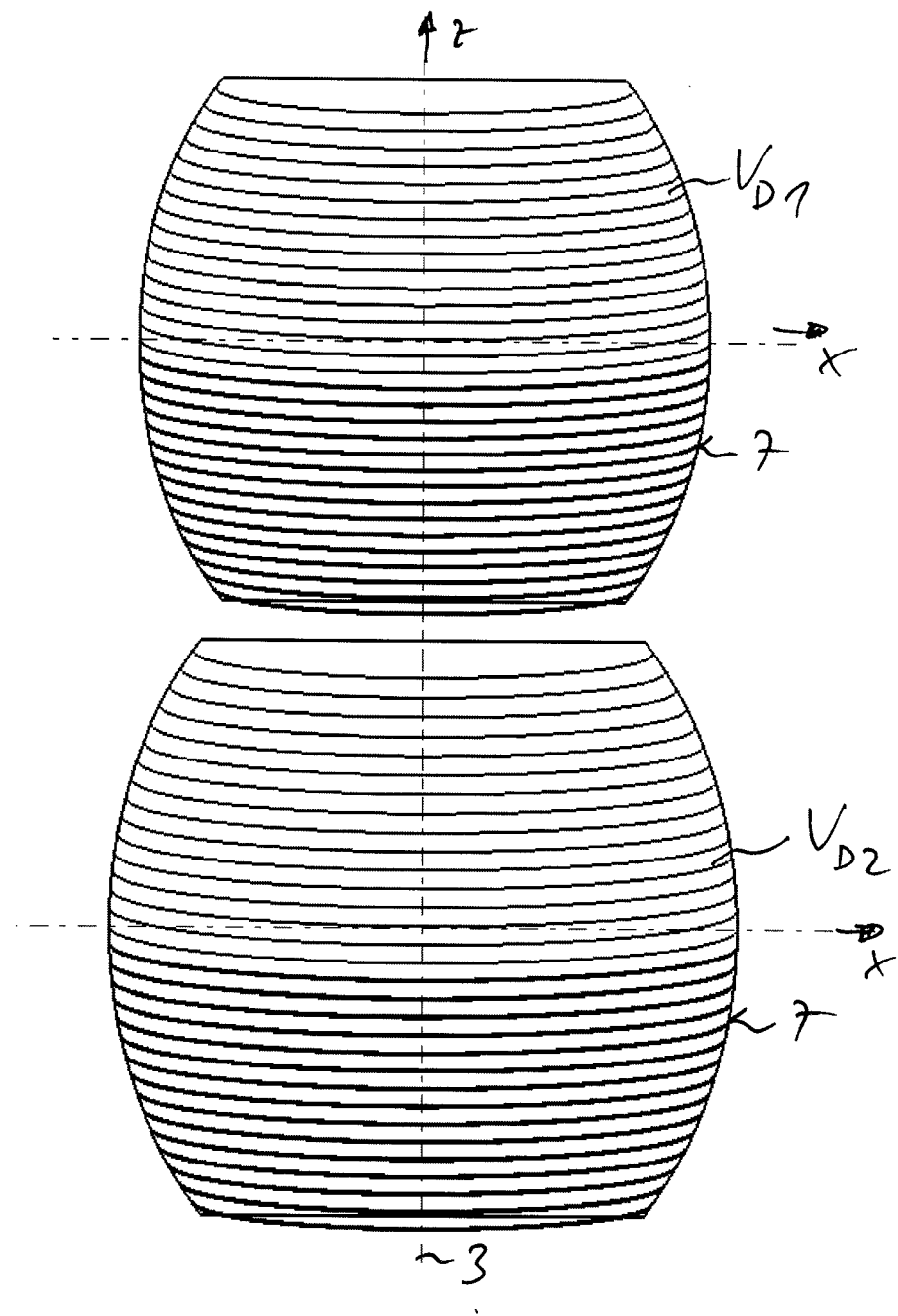

The drawings show:

FIG. 1 A lateral view of a headlamp with a light source and an optic unit comprising a lens, FIG. 2 Representation of a lens face of the lens with variation of a deformation parameter U of the lens equation and FIG. 3 Representation of the lens face of the lens with variation of a deformation parameter V of the lens equation.

A headlamp for vehicles serves the generation of a given light distribution, e.g. a low beam light distribution, high beam light distribution, motorway light distribution resp. adaptive light distribution.

According to an embodiment of the invention according to FIG. 1, the headlamp has a number of semiconductor-based light sources 1 being arranged on a substrate 2. The substrate 2 is embodied as a printed circuit board, preferably embodies as a rigid printed circuit board, which extends in an optical unit 4 arranged vertically relative to an optical axis 3 of a main radiation direction H in front of the light sources 1. The semiconductor-based light sources 1 are embodied as LED-light sources being arranged matrix-like on the substrate 2. The substrate 2 does therefore carry a multitude of these semiconductor-based light sources.

The optical unit 4 arranged in front of the light sources 1 in the main radiation direction H has a primary optical element 5 and a secondary optical element 6 arranged in front of the former in the main radiation direction H. The primary optical element 5 is arranged in the vicinity of the substrate 2.

The secondary optical element 6 is embodied as a lens having (a) dome-shaped lens face 7. The lens 6 effects a collimation of the light beams L emitted by the light sources 1, as can be seen in FIG. 1. The optical unit 4 can therefore also be considered as a collimation unit.

Usually, the lens face is calculated by means of a lens equation being represented as a conic section equation in vertex shape with asphere terms added as a polynomial development. This lens equation is solved for the z-coordinate, which at the same time points in the direction of the optical axis, resulting in the following explicit lens equation.

$$z = \frac{cr^2}{1 + \sqrt{1 - (1+K)c^2 r^2}} + \sum_{k=1}^{5} \alpha_{2k} r^{2k}$$

Herein is:
z=z-coordinate on the optical face,
r=lateral distance of a point of the optical face from the z-axis,
c=vertex radius of the aspherical baseline,
K=conical constant,
α=asphere coefficient.

The asphere terms serve as deformation parameters and therefore indicate the deviation of the lens face relative to the cone shape.

According to the invention, a conic section equation in vertex shape is assumed, which is present in an implicit form. This lens equation is complemented by deformation parameters, wherein a first deformation parameter U and a second deformation parameter V effect changes of the lens face 7 with different preferred directions. By variation of the first deformation parameter U, an ellipsoid-of-rotation-shaped change of the lens face 7 is achieved. By variation of the second deformation parameter V, a spherical change of the lens face 7 is achieved.

The lens equation according to the invention is represented below:

$$\frac{k}{R}z^2 - 2z[1 + U(\vec{r})] + \frac{1}{R}\vec{r}^2 + V(\vec{r}) = 0$$

Herein is:
k=conical constant
R=curvature radius of the lens face 7,
$\vec{r}$=position vector in space $$\left(\vec{r} = \begin{bmatrix} x \\ y \\ z \end{bmatrix}\right),$$

The first deformation parameter U results from a series expansion, $$U(\vec{r}) = U_1 \vec{r}^2 + U_2 \vec{r}^4 + \ldots$$

Wherein the series forms a sum of products being composed of deformation coefficients $U_1, U_2 \ldots U_n$ and position vectors $\vec{r}$. The deformation coefficients U1, U2, . . . Un serve as development coefficients in these terms. With every further term, the order of the position vectors $\vec{r}$ rises by two.

The second deformation parameter V is formed as a series expansion.

$$V(\vec{r}) = V_1 \vec{r}^4 + V_2 \vec{r}^6 + \ldots$$

wherein summands of the series are formed by the product of deformation coefficients $V_1$, $V_2$, $V_n$ and the position vector $\vec{r}$. The order of the terms starts with four and increases by two with any further term. The terms of the second deformation parameter V therefore have even-numbered orders, like the terms of the first deformation parameter U.

As can be seen in the lens equation, the first deformation parameter U is multiplied with a z-coordinate, wherein the z-coordinate points in the direction of the optical axis 3. The second deformation parameter V is positioned in the lens equation as a summand.

By variation of the first deformation parameter U and/or the second deformation parameter V, a continuous deformation of the of the cone-shaped lens face in the direction of a target state can take place, based on an initial state in which U=0 and V=0 and the lens face 7 is therefore described with the conic-section-equation, in which the lens face 7 fulfils the optical prerequisites for the generation of the given light distribution.

The variation of the first deformation parameter U effects a different change of the lens face 7 in the direction of the optical axis 3 and in the direction vertical to the optical axis 3, as can be seen in FIG. 2. Here, two deformations $U_{D1}$ and $U_{D2}$, which are effected by different first deformation parameters U, are represented in an exemplary manner.

It is evident, that both deformation parameters $U_{D1}$ and $U_{D2}$ effect a ellipsoid-of-rotation-shaped change of the lens face 7. The deformation parameter $U_{D2}$, however, effects a proportionately larger change toward the direction of the optical axis 3 than in the direction transverse to the same. Therefore, the first deformation parameter 1 effects a laterally isotropic deformation of the lens face 7.

In FIG. 3, two deformation parameters $V_{D1}$ and $V_{D2}$ are represented in an exemplary manner, which virtually effects an isotropic deformation of the lens face 7. In comparison with the deformation parameter $V_{D1}$, the deformation parameter $V_{D2}$ effects a deformation of the lens face 7 which is uniform in the direction of the optical axis 3 and vertical to the optical axis 3.

Starting from the conic shape, the deformation parameters U on one hand and V on the other hand effecting different preferred deformation directions resp. different deformation contours therefore allow a more directed approximation of the ideal lens shape of the lens face 7 having the desired optical properties. Advantageously, a vertex dimension of the lens 6 can be reduced in particular.

According to an embodiment of the invention which is not represented, the optical unit may also only comprise one single lens.

Alternatively, the optical unit may be formed by means of a multitude of lenses, wherein at least one lens is calculated according to the lens equation according to the invention, and the other lenses according to the known lens equation.

REFERENCE SIGN LIST

1 Light sources
2 Substrate
3 Axis
4 Optical unit
5 Primary optical element
6 Secondary optical element
7 Lens face
H Main radiation direction
L Light beams
U First deformation parameter
V Second deformation parameter
$\vec{r}$ Position vector

The invention claimed is:

1. A headlamp for a vehicle comprising:
a plurality of semiconductor-based light sources arranged on a substrate;
an optical unit having at least one lens with a lens face for the generation of a given light distribution,
wherein the lens surface is calculated by means of a lens equation, which is formed by means of a conic section equation completed by a deformation parameter, so that the lens face is determined with a deviation from a conic section shape,
wherein a first deformation parameter for the change of the lens face is provided according to various shape change degrees in the direction of the optical axis and vertically relative to an optical axis, and
that a second deformation parameter for the change of the lens face is provided according to identical shape change degrees in the direction of the optical axis and vertically to the optical axis, and
wherein the first and second deformation parameters are each formed as a series, wherein the summands of the series are composed of a product of a deformation coefficient and a position vector.

2. The headlamp according to claim 1, wherein the first deformation parameter serves an ellipsoid-of-rotation-shaped change of the lens face and the second deformation parameter serves a spherical change of the lens face.

3. The headlamp according to claim 1 wherein the position vectors of the series are formed by the deformation parameters by even-numbered powers.

4. A headlamp for a vehicle comprising:
a plurality of semiconductor-based light sources arranged on a substrate;
an optical unit having at least one lens with a lens face for the generation of a given light distribution,
wherein the lens surface is calculated by means of a lens equation, which is formed by means of a conic section equation completed by a deformation parameter, so that the lens face is determined with a deviation from a conic section shape,
wherein a first deformation parameter for the change of the lens face is provided according to various shape change degrees in the direction of the optical axis and vertically relative to an optical axis, and
that a second deformation parameter for the change of the lens face is provided according to identical shape change degrees in the direction of the optical axis and vertically to the optical axis, and
wherein the first deformation parameter and a coordinate along which an optical axis of the lens runs, form a product in the lens equation, and that the second deformation parameter forms one of several summands of the lens equation being present in an implicit form.

5. A headlamp for a vehicle comprising:
a plurality of semiconductor-based light sources arranged on a substrate;
an optical unit having at least one lens with a lens face for the generation of a given light distribution,
wherein the lens surface can be calculated by means of a lens equation, which is formed by means of a conic section equation completed by a deformation parameter, so that the lens face is determined with a deviation from a conic section shape,
wherein a first deformation parameter for the change of the lens face is provided according to various shape change degrees in the direction of the optical axis and vertically relative to the optical axis on one hand, and
that a second deformation parameter for the change of the lens face is provided according to identical shape change degrees in the direction of the optical axis and vertically to the optical axis on the other hand, and
wherein the lens equation is described by the following term:

$$\frac{k}{R}z^2 - 2z[1 + U(\vec{r})] + \frac{1}{R}\vec{r}^2 + V(\vec{r}) = 0$$

wherein k is a conical constant, R is a curvature radius of the lens face, $\vec{r}$ and is a position vector is space.

6. The headlamp according to claim 1 wherein several semiconductor-based light sources are arranged in a matrix manner.

7. The headlamp according to claim 1 wherein the optical unit has one or more lenses, of which at least one lens is calculated according to the lens equation.

8. The headlamp according to claim 1 wherein the lens is brought from an initial state, in which the lens face is described by the conic section equation, into a target state, in which the lens has required optical properties, by continuous deformation of the lens face.

9. The headlamp according to claim 1 wherein the given light distribution is achieved by at least one lens, wherein the lens face is calculated by variation of at least one of the first deformation parameter and the second deformation parameter in the lens equation.

* * * * *